US012122331B2

(12) United States Patent
Menicovich et al.

(10) Patent No.: US 12,122,331 B2
(45) Date of Patent: Oct. 22, 2024

(54) PREVENTING RADIO AND LIGHT SIGNAL TRANSMISSION LOSS THROUGH A TRANSMISSION SURFACE DUE TO WEATHER ENVIRONMENTAL AND OPERATIONAL CONDITIONS USING ACTIVE FLOW CONTROL ACTUATORS

(71) Applicant: Actasys, Inc., Brooklyn, NY (US)

(72) Inventors: David Menicovich, Hoboken, NJ (US); Anthony Mickalauskas, Troy, NY (US)

(73) Assignee: Actasys Inc., Brooklyn, NY (US)

( * ) Notice: Subject to any disclaimer, the term of this patent is extended or adjusted under 35 U.S.C. 154(b) by 634 days.

(21) Appl. No.: 17/261,744

(22) PCT Filed: Jul. 26, 2019

(86) PCT No.: PCT/US2019/043622
§ 371 (c)(1),
(2) Date: Jan. 20, 2021

(87) PCT Pub. No.: WO2020/023852
PCT Pub. Date: Jan. 30, 2020

(65) Prior Publication Data
US 2021/0339711 A1 Nov. 4, 2021

Related U.S. Application Data

(60) Provisional application No. 62/711,037, filed on Jul. 27, 2018.

(51) Int. Cl.
*B05B 1/04* (2006.01)
*B05B 1/26* (2006.01)
(Continued)

(52) U.S. Cl.
CPC ............... *B60S 1/526* (2013.01); *B05B 1/04* (2013.01); *B05B 1/26* (2013.01); *B05B 9/002* (2013.01);
(Continued)

(58) Field of Classification Search
None
See application file for complete search history.

(56) References Cited

U.S. PATENT DOCUMENTS 5,847,826 A 12/1998 Fukui et al.
2003/0155001 A1 8/2003 Hoetzer et al.
(Continued)

FOREIGN PATENT DOCUMENTS

CN 103286097 A 9/2013
CN 103448686 A 12/2013
(Continued)

OTHER PUBLICATIONS

The Extended European Search Report issued by the European Patent Office on Jul. 13, 2022 for corresponding European Patent Application No. 19842213.1; 11 pages.
(Continued)

*Primary Examiner* — Levon J Shahinian

(57) ABSTRACT

Systems and methods for cleaning transmission surfaces for optical and sensor surfaces in order to maintain optimal performance under a variety of weather and environmental conditions using synthetic jet actuators. The actuators can emit a jet of water or air depending on environmental conditions and the waveform, frequency, amplitude of the actuator can be adjusted based on particle characteristics and transmission signal quality in order to better clean the surfaces.

17 Claims, 12 Drawing Sheets

(51) Int. Cl.
  *B05B 9/00* (2006.01)
  *B05B 12/12* (2006.01)
  *B05B 17/06* (2006.01)
  *B60S 1/08* (2006.01)
  *B60S 1/48* (2006.01)
  *B60S 1/52* (2006.01)
  *B60S 1/54* (2006.01)
  *B60S 1/56* (2006.01)
  *F24S 40/20* (2018.01)
  *G02B 27/00* (2006.01)
  *H02S 40/10* (2014.01)
  *H02S 40/12* (2014.01)
  *H02S 50/00* (2014.01)

(52) U.S. Cl.
  CPC .......... *B05B 12/12* (2013.01); *B05B 17/0607* (2013.01); *B05B 17/0669* (2013.01); *B05B 17/0676* (2013.01); *B60S 1/0818* (2013.01); *B60S 1/485* (2013.01); *B60S 1/54* (2013.01); *B60S 1/548* (2013.01); *B60S 1/56* (2013.01); *F24S 40/20* (2018.05); *G02B 27/0006* (2013.01); *H02S 40/10* (2014.12); *H02S 40/12* (2014.12); *H02S 50/00* (2013.01); *Y02E 10/50* (2013.01)

(56) References Cited

U.S. PATENT DOCUMENTS

| | | |
|---|---|---|
| 2013/0146577 A1 | 6/2013 | Haig et al. |
| 2013/0219742 A1 | 8/2013 | Field et al. |
| 2014/0036132 A1 | 2/2014 | Pawlowski |
| 2014/0270379 A1 | 9/2014 | Snider |
| 2015/0183406 A1 | 7/2015 | Tanaka et al. |
| 2015/0202663 A1 | 7/2015 | Oba et al. |
| 2015/0203077 A1 | 7/2015 | Gokan |
| 2015/0311859 A1 | 10/2015 | Hamdi |
| 2016/0297406 A1 | 10/2016 | Jansen et al. |
| 2016/0376141 A1 | 12/2016 | Springer |
| 2017/0036650 A1 | 2/2017 | Hester et al. |
| 2017/0182980 A1 | 6/2017 | Davies et al. |
| 2017/0259788 A1 | 9/2017 | Villa-Real |
| 2018/0086316 A1 | 3/2018 | Trebouet et al. |
| 2018/0105146 A1 | 4/2018 | Lopez et al. |
| 2018/0134258 A1 | 5/2018 | Ekola et al. |
| 2019/0299939 A1 | 10/2019 | Davies et al. |
| 2020/0001834 A1 | 1/2020 | Grasso et al. |
| 2020/0057301 A1 | 2/2020 | Kuratani et al. |
| 2020/0108425 A1 | 4/2020 | Oba et al. |
| 2021/0009088 A1 | 1/2021 | Hayashi et al. |

FOREIGN PATENT DOCUMENTS

| | | |
|---|---|---|
| CN | 104044558 A | 9/2014 |
| CN | 104470771 A | 3/2015 |
| CN | 104684769 A | 6/2015 |
| CN | 106232437 A | 12/2016 |
| CN | 106660525 A | 5/2017 |
| CN | 107930889 A | 4/2018 |
| EP | 2878999 | 9/2016 |
| EP | 2873572 | 5/2017 |
| EP | 2631734 | 7/2019 |
| JP | 2004-036421 | 2/2004 |
| JP | 2014-019403 A | 2/2014 |
| JP | 2014-026049 A | 2/2014 |
| JP | 2016-009099 A | 1/2016 |
| JP | 6090318 A | 3/2017 |
| KR | 10-1853843 B | 5/2018 |
| KR | 101853843 | 5/2018 |
| WO | 2014/017178 A1 | 1/2014 |
| WO | WO2017/147299 | 8/2017 |
| WO | 2018/059806 A1 | 4/2018 |
| WO | 2018/198465 | 11/2018 |

OTHER PUBLICATIONS

Office Action mailed Jun. 20, 2023 in Japanese Patent Application No. 2021-527019 (5 pages in Japanese and 11 pages English translation).
The Partial Supplementary European Search Report issued by the European Patent Office on Mar. 24, 2022 for European Patent Application No. 19842213.1; 11 pages.
Office Action and Search Report mailed Sep. 18, 2023 in Chinese Patent Application No. 201980060666.7 (13 pages in Chinese and 8 pages English translation).
International Search Report mailed Nov. 29, 2019 for International Patent Application No. PCT/US2019/043622 (4 pages).
Written Opinion of the International Searching Authority mailed Nov. 29, 2019 for International Patent Application No. PCT/US2019/043622 (8 pages).
Office Action mailed Nov. 28, 2023 for Korean Patent Application No. 10-2021-7005737 (9 pages in Korean and 8 pages English translation).
Office Action mailed Jan. 4, 2024 for European Patent Application No. 19842213.1 (5 pages).

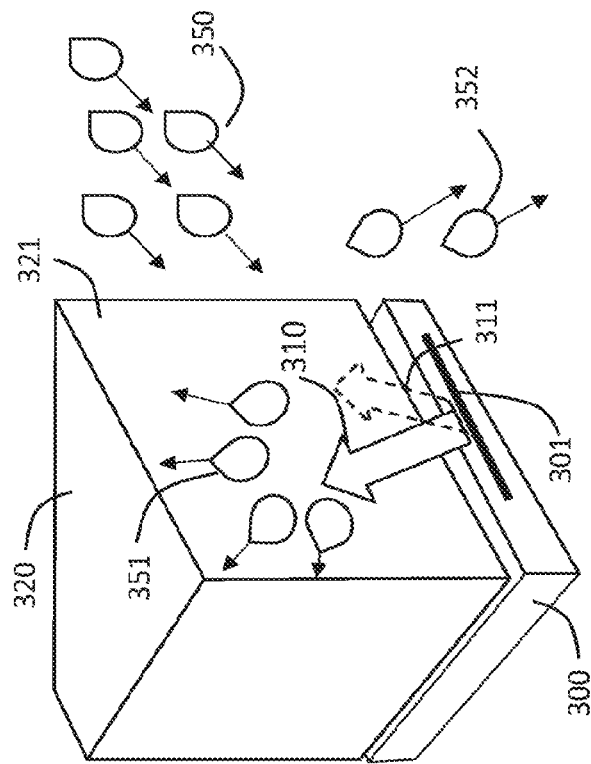
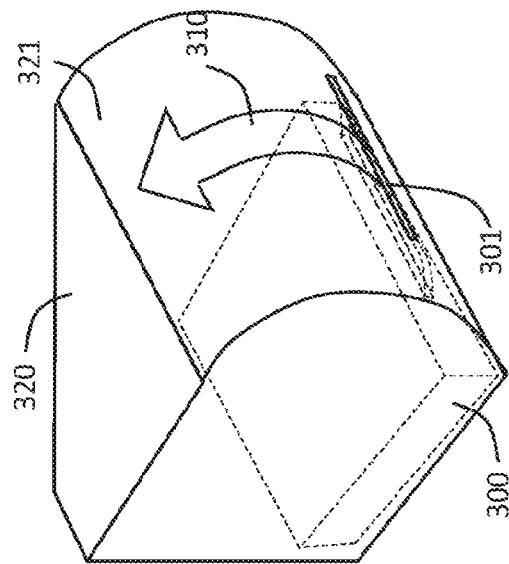
FIG. 3B
FIG. 3A

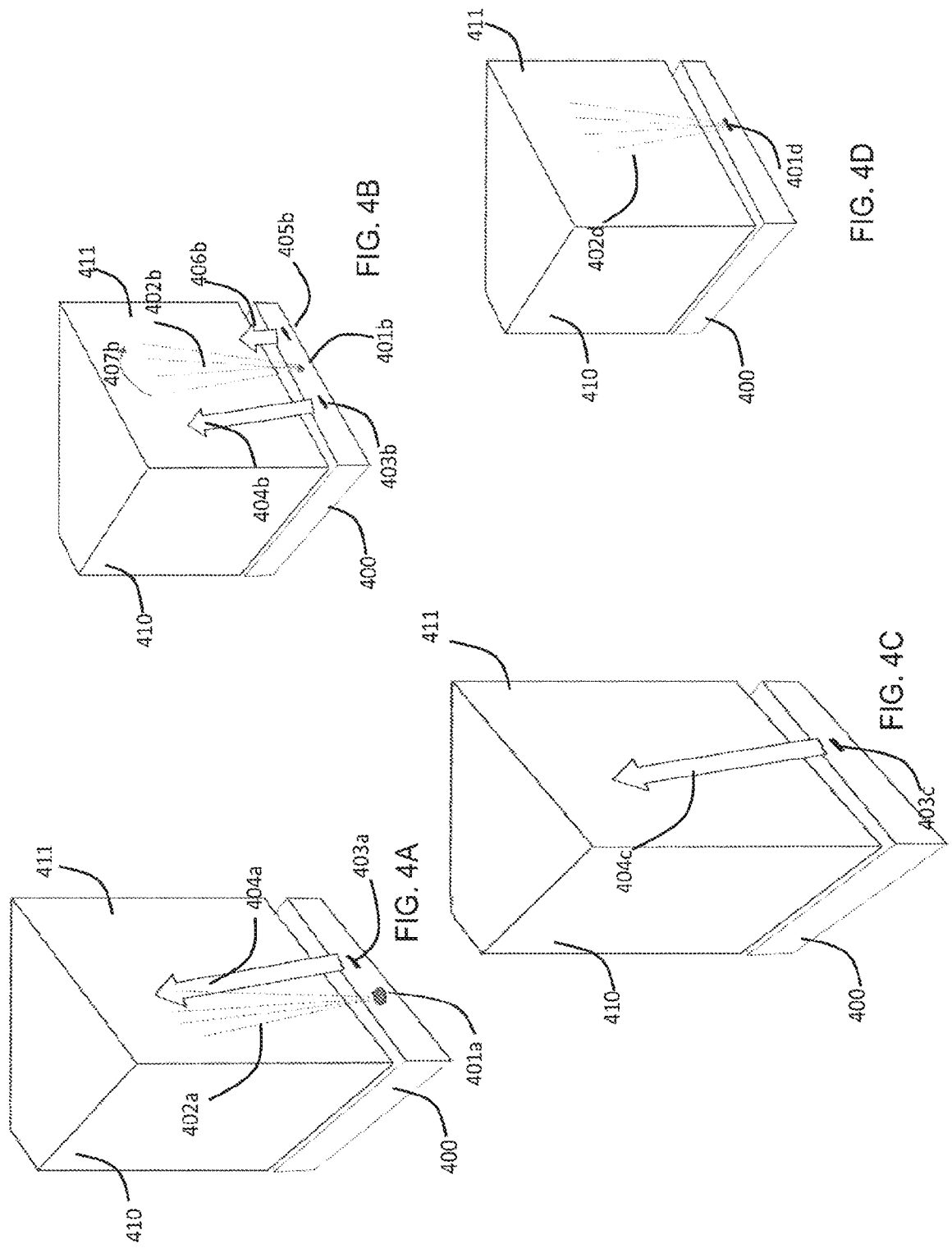

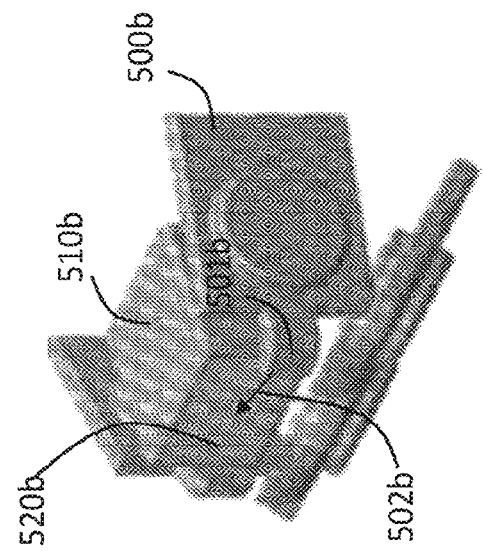
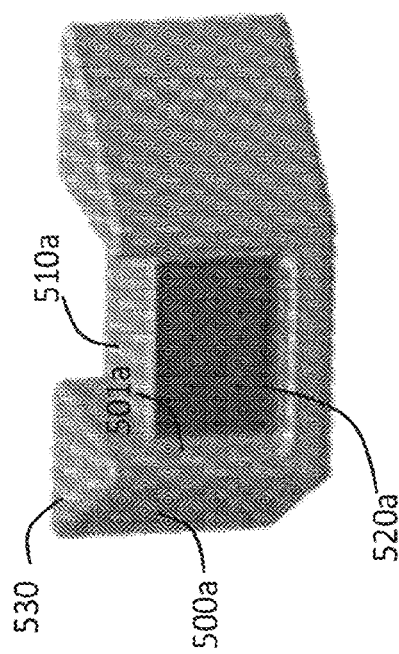
FIG. 5A
FIG. 5B

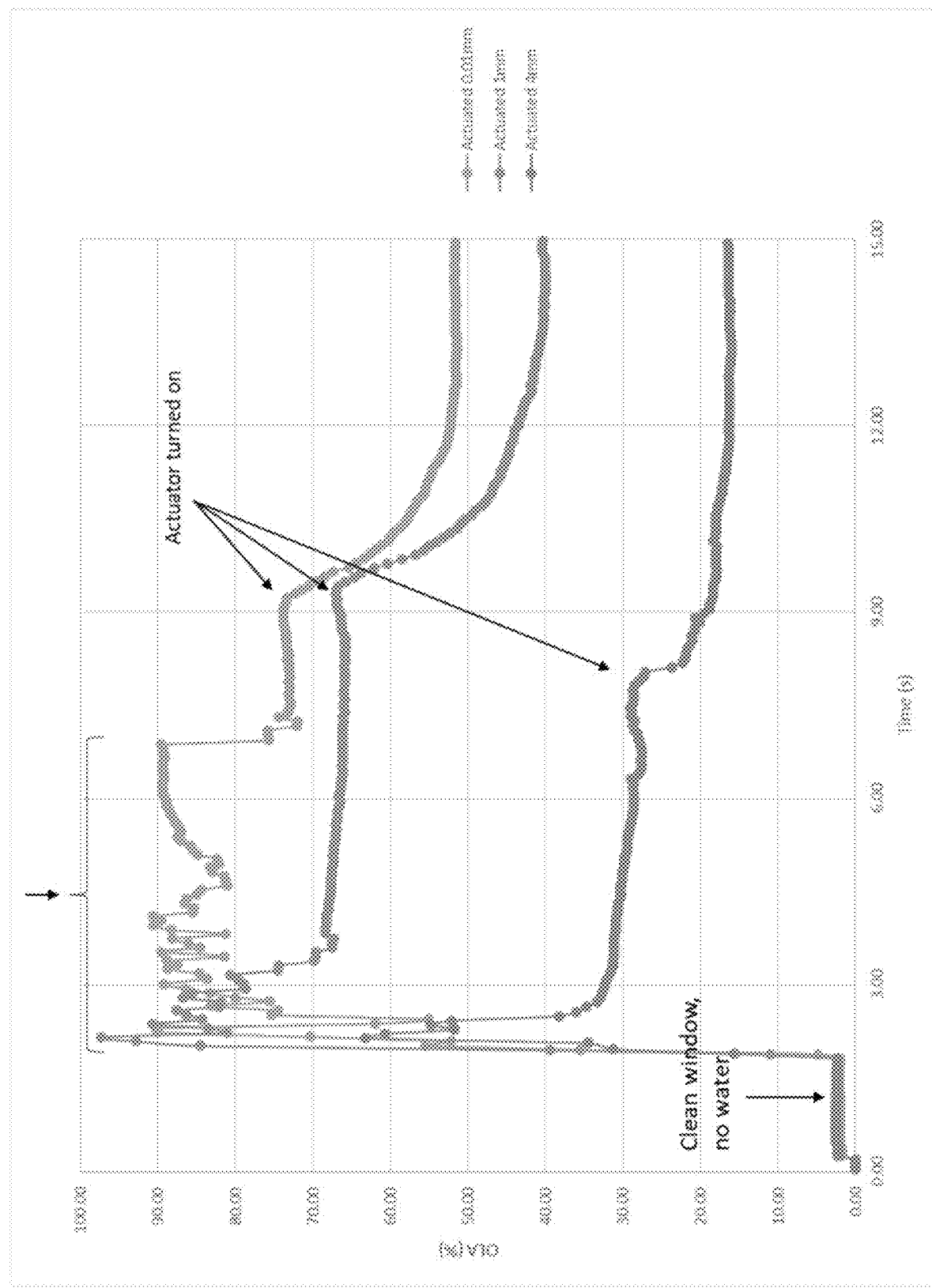

PREVENTING RADIO AND LIGHT SIGNAL TRANSMISSION LOSS THROUGH A TRANSMISSION SURFACE DUE TO WEATHER ENVIRONMENTAL AND OPERATIONAL CONDITIONS USING ACTIVE FLOW CONTROL ACTUATORS

CROSS-REFERENCE TO RELATED APPLICATION

This application claims the priority and benefit to U.S. Provisional Patent Application No. 62/711,037 filed Jul. 27, 2018, the entire contents of which are incorporated by reference.

FIELD OF THE INVENTION

The present invention relates generally to systems and methods for preventing radio and light transmission losses through a transmission surface due to environmental conditions and more particularly to using one or more actuators to generate jets of air and/or liquid to clean the surface and remove any particles and environmental contaminants that may have accumulated on the transmission surface.

BACKGROUND OF THE INVENTION

Recent decades have seen significant advancements in using light and radio waves in a myriad of applications intended to augment human activity, i.e., sensing objects surrounding vehicles using various types of sensors, harvesting solar energy using photovoltaic panels, and keeping building floors naturally lit using large perimeter curtain walls. For such applications, there is typically a surface intermediating between exterior environmental conditions (where the light or radar is received from or transmitted to) and an internal space or volume where an activity related to signal and radio reception or transmission takes place.

The surface is usually transparent or translucent and made of glass, polycarbonate, plastic or other materials. In most cases, the surface is intended as a protective layer from the external environment. In some cases, the surface plays a role in signal reception and/or transmission such as concentration, reflection, etc.

A key concern in these applications is maintaining signal transmission under various weather conditions through the surface. Particle accumulation and contamination from dust, snow and ice across the exterior part of the surface can significantly reduce the ability of light and radar signals from passing through it. Also, the formation of a water film across the surface during precipitation can deteriorate the signal such that it is no longer reliable and the data it carries is no longer enough to perform the essential functions the vision sensor is tasked with such as object detection to ensure the vehicle safety.

One industry in which the maintenance of clear surfaces is important is in the automotive industry where it is important to detect objects (either by a human or devices/sensors) in order to control a motor vehicle and navigate it safely. Automotive radar sensors were first employed for use in cruise control systems in the 1980s. The use of automotive radar sensors has recently spread to Autonomous Intelligent Cruise Control (AICC) and Collision Mitigation (CM) systems in order to improve vehicle safety, efficiency, and economy, resulting in the development of various types of sensors for automobiles, including micro- and millimeter-wave radars.

Similar to millimeter-wave radar sensors, infrared-based sensors such as LiDAR have also been employed for environmental recognition, particularly for the Adaptive Cruise Control (ACC) system by considering required performance and feasibility. Both infrared-based and millimeter-wave radar sensors provide range, velocity and angle information on targets ahead of the vehicle. This is used along with vehicle dynamics data to correlate projected vehicle path and detected obstacle positions. The resulting data is used to control the vehicle throttle, brakes, steering and the vehicle transmission. ACC systems adapt the speed of the vehicle according to the speed of the vehicle ahead, in order to maintain a constant distance between the two vehicles. The driver sets the maximum speed and the minimum separation desired. Both sensor systems can also be used to locate and track multiple targets on the road ahead, to anticipate traffic conditions in the driving lane. Presently, the ACC system application of millimeter-wave and infrared-based sensors is marketed as a comfort and convenience option rather than a safety option. There is still a safety risk associated with its use on automobiles. Due to the critical impact of radar and LiDAR sensors on the ACC system, it is important to conduct accurate verification and calibration of the system at various stages of development, production, and installation.

New generation systems make use of multiple sensors to extend the ACC system to city driving or stop-and-go traffic, pre-crash sensing, collision warning and avoidance systems (CWAS). These are typically short-range applications and various sensor types can be used, including infrared, vision, ultrasonic, and micro-wave radar. For most applications beyond highway ACC system, multiple sensor systems must be used in conjunction with the long-range ACC LiDAR or millimeter-wave radar sensors. The combination of technologies is the key to achieving high-level environmental recognition and to advance the goal of autonomous driving.

Most of these future safety-oriented applications are associated with increasing demands for greater performance and reliability in environmental recognition sensors in any traffic and weather scenario.

Unfortunately, adverse weather conditions provide a challenge for successful operation of the majority of the sensors required for CWAS. Under adverse weather conditions, the electromagnetic wave transmitted and received by the CWAS interacts both with hydrometeors (particles of water in solid or liquid form in the atmosphere) and materials which build up on the surface of the sensor or its protective covering. Examples of hydrometeors include, but are not limited to, mist, rain, freezing rain, ice pellets, snow, hail and fog. Exemplary expected materials on the surface of the sensor or its protective covering include, but are not limited to, grit and dirt as well as dry snow and water films, which may be formed through condensation, impingement and adhesion of water-particles.

Different forms of water-particles (mist, rain, freezing rain, ice pellets, snow, hail and fog) affect the infrared and millimeter-wave propagation unequally. The reason is that the absorption and total scattering cross sections of the water particles depend on the relationship between particle-size and wavelength as well as on the particle density and extent.

Almost all sizes of these water-particles are greater than the infrared wavelengths. They may consequently yield maximum scattering cross sections in the infrared and visible light range. This results in quite large attenuation and backscattered signal, particularly in dense water-particles like heavy rain and fog droplets. This degrades the performance of LiDAR sensor not only by limiting the maximum detection range to that of a comparable human eye, but also by increasing processes, it occupies nontrivial amounts of memory and computational throughput to filter out irrelevant detections due to water particles.

In the millimeter-wave range, only raindrops with rainfall intensities greater than 4 mm can obtain maximum absorption and total scattering cross sections. This can introduce strong rain attenuation and backscattering. The effects of snow and hail are difficult to assess precisely since their water content varies significantly. In general, ice has a much smaller loss than water of the same mass, and millimeter-wave attenuation in dry snow is hence negligible. If the snow is wet, however, the attenuation increases considerably but is typically expected to be less than moderate rain.

In the case of water film on the surface of an antenna or its radome (i.e., lenses, antennas, or covers), particularly for millimeter waves, a lesser degree of moisture on the surface of an antenna lens or radome can adversely affect wave propagation and introduce cessation of millimeter-wave radar operation.

Dust materials like dry snow, grit and dirt on the LiDAR lens may also harm measurement sensitivity due to attenuation and diffraction phenomena.

Further, in the case where the transmission surface permits a back-up camera to show the driver the surroundings, a surface that is too blocked with particles can cause the camera to malfunction triggering an alert and forcing the vehicle to stop. When the vehicle is travelling at low speeds such as in urban areas and is exposed to rain, cameras as well as other sensors cannot rely on airflow due to vehicle motion to sweep the water.

Techniques exist in the prior art to remove particle accumulation on these surfaces, but they all have their limitations. For example, the removal of snow by thermal means (i.e., by use of a heater) may generally affect the transmission property of the transmission surface material, its lifespan, cleaning system cost, vehicle energy consumption profile, and even passenger safety. The signal loss due to the presence of a water film may be reduced significantly by treating the surface to make it either non-wetting or water repellent. This method has shown positive results when applied to microwave airport surveillance radar and ground-based radars for satellite communications. However, this method has drawbacks when applied to an application such as an automotive application using millimeter-wave radar. In such an environment, the rainwater may not be expected to form a uniform film due to exerted aerodynamic force when the vehicle is in operation, but forms many small streaks that rapidly run off antenna and radome surfaces in narrow rivulets. Further, frozen snow and freezing rain may easily cause a moist and/or speckled surface on the antenna or radome. Under such environmental conditions, the application of water repellant or the use of non-wetting surfaces inadequately cleans the surface because they don't effectively remove the particles, have high wear and tear and, in the case of water repellant, a time-limited treatment period. Additionally, the traditional placement of automotive radar sensors in the front grille area of a vehicle, where aging and dusting are significant, impacts on such water-repellent materials.

According to theoretical and experimental studies, an insignificant amount of wetness can lead to considerable performance degradation of millimeter-wave radar sensors. Therefore, a need exists to keep the surface of these sensors free of wetness.

Another industry in which the maintenance of clear surfaces is paramount is in the solar electricity industry, where the surfaces on an array of photovoltaic solar panels must remain clean in order to efficiently generate electricity. Although solar energy facilities are vulnerable to often overlooked on-site omnipresent practicalities such as deposition of dust, bird droppings, sand, tree leaves and saltwater stains, that can significantly degrade the efficiency of solar thermal installations. Recent research reveals how significant the performance loss is when caused by the soiling of photovoltaic (PV) modules. (See https://renewablesnow-.com/news/dust-pollution-buildup-can-cut-pv-output-by-up-to-35-study-573691/.) Soiling includes dirt, snow, and other foreign matter on the surface of the PV module that prevents solar radiation from reaching the solar cells. Dirt accumulation is both location and weather dependent.

Soiling during the operational life of solar modules causes losses in their electric power production. Accumulation of dirt is of critical importance, as factors that decrease PV systems efficiency could make them an unattractive or not economically feasible alternative energy source.

Depending on the local reality, loss in electric power product of PV's due to soiling ranges from 5.2 to 17%. In extreme cases, higher values may occur (25%). Regular cleaning of solar modules is therefore essential. Without proper surface cleaning, a solar farm's performance and the owner's profit can drop up to 15-17% in the long term.

In extreme and very dry, sandy climates, where cleansing rains are sparse, failure to clean PV panels can cause even greater losses. A solar facility owner or operator can no longer change any construction features, such as wire resistance, or the inverter efficiency. In other words, reliance on rain as a mean to clean PV panels leads to severe losses in efficiency.

Therefore, a need exists to maintain clean surfaces on the solar cells. The use of high-pressure water or steam cleaning technologies for washing of PV panels is prohibited in order to avoid damage to the exterior layer of the panels. Rain cannot be relied upon either to effectively clean the PV panels as rain does not necessarily provide a 100% cleaning effect and depending on the rain and on the panel angles, some portion of the panel may not get completely cleaned. Additionally, there may not always be rain at the opportune time to clean the PV panel.

A need also exists for an adaptive system that can adapt to the dynamic conditions (i.e., types of interferences) at the transmission surface that affect the transmissibility through the transmission surface.

Active flow control actuators (such as synthetic jets, plasma jets, and other types) generate an unsteady air-jet at a frequency or frequency-range. Unsteady jets have been shown to have a much more efficient structure, comprised of vortices and other flow patterns, compared to compressed air actuators, fans, blowers and other steady forms of air supply, in air transport applications such as heat transfer, mixing, and spray control. (See http://www.cds.caltech.edu/~murray/courses/cds101/fa04/caltech/collis-etal-pas-2004.pdf.)

Typically, such actuators are used as a means to improve the airflow around a bluff body-like shape (airfoil, wing, wind turbine blade, vehicle spoiler, building parapet, etc.) and not as a stand-alone device. Secondly, their use has heretofore been to deflect air in order to deal with air-born phenomena. A more detailed discussion of actuators can be found in U.S. Pat. No. 9,567,017, the entire content of which is hereby incorporated by reference herein.

SUMMARY OF THE INVENTION

Systems and methods for cleaning surfaces through the use of one or an array of actuators for generating jets of air or liquid are provided.

In embodiments, the actuators generate a local air-jet that removes particles directly from the transmission surface. In embodiments where the actuators are used with a moving vehicle, the local air jet interacts with the airflow that passes across the transmission surface as a result of the vehicle's motion. As a result, at highway speed, the synergy between the actuator air-jet and the incoming airflow further improves the cleaning performance compared to a case where the transmission surface would have been exposed to either an actuator air jet or an incoming airflow alone.

The present invention presents novel ways to use actuators. In accordance with embodiments of the present invention, actuators are (1) used to remove water or other particles to improve optical performance through a transmission surface; (2) integrated with or attached to vision sensors mechanically or as part of a control feedback loop; and (3) combined with means to control their temperature, and release angle.

In embodiments, the actuator power amplitude, waveform and frequency is informed by environmental factors such as precipitation, water-based and dust-type particles and the interference caused to a transmission surface. In a preferred embodiment, when the vehicle or vision sensor identifies the transmission quality through the transmission surface to be insufficient, one or the other will activate the cleaning system to clean the transmission surface until the transmission signal quality increases above a predetermined threshold.

In an exemplary embodiment of the present invention, the system comprises at least one actuator provided for cleaning one or more surfaces that are part of a vehicle by generating one or more jets of air in order to clean the one or more surfaces and remove particles and environmental contaminants such that their light and energy transmission properties are maintained under various environmental conditions.

In one embodiment, the system is comprised of one actuator. In another embodiment an array of actuators is used. In embodiments where an array of actuators is used the actuators can be operated with the same inputs such a voltage, actuation frequency, or operated separately from each other such that each actuator receives different inputs based on its location on the vehicle, the requirements of the vision sensor it is tasked with cleaning, the type of particles it is required to remove and the local air flow conditions. For example, if the system is comprised of at least one roof-mounted LiDAR and at least one rear camera mounted on the rear vehicle bumper, each actuator will receive different inputs when in motion due to the difference in airflow conditions between the roof and the rear bumper and the same input when stationary.

In embodiments, the actuators may comprise synthetic jet actuators or other active flow control actuators. The actuators may be standalone actuators delivering air jets to clean the surfaces. In other embodiments the actuators may be combined with a liquid, which may be water or for use in colder climates preferably a liquid with a freezing temperature below expected ambient air conditions, to provide pressurized air and liquid. In embodiments, the actuator or actuators are used in combination with heating and cooling elements to vary air and/or liquid temperature for applications such as de-icing.

In embodiments, the actuator is operated such that it produces an air-jet with a vortical structure that is effectively removing droplets resting on the optical surface. Experiments conducted have demonstrated that there is a relationship between actuation frequency and droplet size, i.e., different droplet sizes can be removed more effectively with associated actuation frequencies. In other words, an air-jet at a certain frequency might be more effective in removing droplets compared to a stronger air-jet at a different frequency.

In a preferred embodiment, in order to address multiple environmental conditions, the sensor cleaning system combines airflow and water spray in a similar manner to a standard windshield wiper system, where a microfluidic nozzle sprays the windshield with water to soften media such as mud or dust while the wipers mechanically remove any residue as well as dry the windshield from the water spray. Similarly, the sensor cleaning system combines air jet and water spray as well as the ability to synchronize efficiently between the two. This efficiency is due to the way in which the synthetic jet actuator is used to generate both these "dry" and "wet" modes. The synthetic jet actuator acts as a pump, pressure regulator and nozzle, all in one, located next to the optical surface to be cleaned. The vicinity to the surface enables for the water supply to be using a local small water reservoir that provides water to the actuator gravitationally or at low pressure. The water is supplied to the actuator (into the cavity, an adapter, released at a certain distance from the nozzle or directly on the optical surface). The synthetic jet actuator switches between "dry" and "wet" modes. While the air-jet blows continuously, the switch is enabled by limiting the water supply to the actuator. This is done by controlling the valve of the water container. When switching to a "wet" mode, the valve is open such that water is released from the container and is sprayed by the air jet. Spraying effectively depends on several parameters such as waveform, actuation frequency and the distance (from the synthetic jet actuator nozzle) where the water is exposed to be blown by the air-jet.

Further experimentation has revealed that signal conditioning parameters such as waveform (sine, trapezoidal, square), modulation frequency, duty cycle, etc., have an impact on how well a synthetic jet actuator cleans a surface. For example, using a trapezoidal waveform with a sharp rise slope provides a strong burst of air which helps coalesce small droplets in the vicinity of the actuator nozzle into larger droplets over a short distance and time period. Coalescence is key to removal of droplets. This is beneficial for cleaning performance as transporting larger droplets across an optical surface is easier compared to removing smaller droplets.

One aspect of the present invention modulates actuation frequency to affect the type of air-jet structures that excite the particle on the transmission surface. These structures interact with the particle and the transmission surface and cause them to vibrate. It has been discovered that particles such as water droplet are excited by the air-jet structures at varying frequencies based on their structure, density, contact angle, etc.

Actuation frequencies in the range of 50-1500 Hz have been shown to interact differently with droplet diameter sizes between 0.01 mm and 4 mm which represent sizes of droplets ranging from vehicle spray splash (0.01 mm or fine) to heavy rain hitting a windshield (4 mm or coarse). For example, air-jets at 1040 Hz remove 4 mm droplets better compared to an air-jet at 360 Hz (both operated using same actuator, waveform, and voltage). For removing 0.01 mm (fine) droplets, a 360 Hz air-jet outperforms one of 1040 Hz, in spite of the fact that the 1040 Hz air jet is stronger in that it has a greater velocity.

It has further been discovered that similar droplet removal performance is achieved when comparing a pulse wave modulation (PWM) signal (carrier f=360 Hz modulation f=30 Hz, 50% duty cycle) compared to pure sine waveform (f=360 Hz) in spite of the fact that the former consumes half of the power of the latter. It has been discovered that a more abrupt pulse of air-jet tends to promote coalescence between droplets found next to the point of contact between the air-jet and the transmission surface. Once droplets coalesce and grow in size, it is easier to the transport them faster over a greater distance across the transmission surface.

In embodiments, the system comprises at least a power supply unit, a control unit, an actuation unit, a water supply unit, software and packaging. In embodiments, the actuation unit comprises an actuator, an adapter, heating and cooling elements to control air-jet temperature. In embodiments, the water supply unit comprises a container, a conduit to supply water into the adapter, actuator, its vicinity or to the transmission surface or its vicinity.

In embodiments, the actuation unit is packaged as a standalone unit. In an embodiment where the actuation unit is used in connection with a vision sensor on a motor vehicle, the actuation unit can be integrated into an automotive part on the vehicle or integrated into the vision sensor as part of its packaging.

In embodiments, the actuators of the present system are mounted on the vehicle or on sensor enclosures to keep one or more of the following surfaces clean: (1) cover vision and position sensors (such as radar, LiDAR, cameras, etc.) and (2) vision-assist devices (such as mirrors and windshields) using actuators mounted on the vehicle (such as ground, maritime, and air vehicles). In a preferred embodiment, the sensors are controlled dynamically through the use of vision sensor diagnostic codes or devices which alert the cleaning system and command it to start or stop operating. In another embodiment, the actuators are controlled by the vehicle electronic control unit (ECU). The ECU can be dedicated to sensor cleaning performance or dedicated to another vehicle activity.

Other than a vehicle, one of ordinary skill in the art would recognize that the surface that could be cleaned with the actuator can be any surface that requires cleaning in order to maintain light and energy transmission properties to the device. For example, the surface may be a surface of a PV cell in a solar array.

The surface to be cleaned might have various degrees of transparency, and be made of various materials such as glass, polycarbonate, etc. The surface might serve different purposes such as a cover to protect the device from environmental conditions, add optical features such as concentration, reflection etc., or serve for aesthetic or styling purposes.

In embodiments where the surface being cleaned is part of the vehicle, the surface might be a part of the vehicle's exterior or a surface that is an add-on to the vehicle. As part of a device, the surface might be a LiDAR lens, camera lens, radar antenna lens, LiDAR radome, radar radome, device encasement or any component that impacts the optical performance of the device. The surface may also be a surface of a device that serves for object and environmental conditions detection and recognition, mapping, geolocation, and navigation of the moving platform. The device might be a sensor such as radar, LiDAR, camera or any other device that uses light, radio and electromagnetic waves as a sensorial input or output or that depends on optics as part of its performance such as an antenna lens.

In embodiments, the system is used to clean the transmission surface of a camera (i.e., front, back up, or other) which suffers from multiple issues such as droplet accumulation during rain, icing, salt, snow accumulations and other that prevent image clarity at sufficient resolution to identify objects and drive safely.

In embodiments, the system is powered electrically by the platform's power supply (battery) or through an auxiliary power supply unit.

In embodiments, the system is controlled by a controller that commands various system parts electronically using a program. The program uses inputs provided by the system, externally to the system, or a combination of both. The controller adapts the performance of the system based on system, vehicle, user preference, and environmental conditions in order to achieve a desired performance. Inputs to the system include wind speed and direction, car speed, sensor sensitivity, and droplet size. The controller records and broadcasts system diagnostics data and system input and output data wirelessly.

In embodiments, the controller provides commands to multiple actuators dedicated to the cleaning of multiple vision sensor types (such as LIDAR, radar, and cameras) at different locations across the vehicle (such as roof front, roof side, front bumper and rear bumper). Each sensor-dedicated actuation unit requires other commands (such as actuation frequency, waveform, amplitude and timing) in order to address vision sensor requirements as they are exposed to different particles (such as rain, mud, slush), aerodynamic conditions and performance requirements.

The controller provides different commands to each actuator based on ECU, vision sensor-related devices or other. In another embodiment, the controller relies on a system program to generate these commands. In this embodiment, the controller receives data from the vehicle and sensors to establish cleaning requirements based on vehicle, environmental, and vision sensing inputs. The controller provides commands also based on the geospatial legal requirements and geofencing of the vehicle location. Such requirements dictate type of object detection range and quality, vehicle speed, visibility and other parameters based on applicable driving laws.

The controller provides input to the water supply unit, and the actuator generates a water spray of a certain density and spread and synchronizes the amount of water provided and air-jet in order to remove effectively and water-efficiently particles from the transmission surface. In embodiments, the controller provides data to heating elements integrated into the actuator, adapter, or packaging to control the temperature of the air-jet based on particle density (such as ice, slush, snow), ambient temperature and target de-freezing time. In another embodiment, the controller is operated according to a preprogrammed look up table. The sensor cleaning system couples these relationships between environmental and actuation parameters to optimize the cleaning performance of an optical surface. Based on real time input or programmed look up table, a controller and software modify actuation properties such as frequency, amplitude, waveform, etc. in response to precipitation conditions (such as droplet size), driving conditions (such as vehicle speed), cross wind and other environmental parameters in addition to optics related inputs (such as transmissivity through the transmission surface).

In embodiments, the sensor cleaning system functions as an enabler for vehicle mounted vision sensors. As such, in a preferred embodiment the sensor cleaning system is integrated within the packaging of a vision sensor, receiving commands from the vision sensor.

In embodiments, the controller includes a user interface that allows for changing program settings.

In one embodiment, the system for cleaning the surface of a vehicle vision sensor comprises a sensor cleaning unit, mounted on the vehicle, having at least one actuator configured to direct a fluid jet onto the vehicle vision sensor, a sensor cleaning unit sensor, mounted on the vehicle, having at least one environment sensor configured to capture environmental sensor data proximate the vehicle, a cleaning electronic control unit configured to receive the environmental sensor data from the sensor cleaning unit sensor and to determine at least one of a drive frequency and a drive amplitude for controlling the at least one actuator of the sensor cleaning unit, based on the received environmental data.

In embodiments, the environment sensor includes at least one of a precipitation sensor or an airflow sensor configured to determine apparent wind speed and wind direction. In embodiments, the precipitation sensor is configured to determine the diameter of rain droplet sizes during a precipitation event.

In a preferred embodiment, the cleaning control unit sets a drive frequency ranging from 360 Hz for rain droplet diameter sizes of 0.01 mm to 1040 Hz for rain droplet diameter sizes of 4 mm. The actuator in embodiments operates using pulse wave modulation and in embodiments comprising a water source connected to the sensor cleaning unit, wherein the cleaning electronic control unit is further configured to choose one of either water from the water source or ambient air for use with the actuator of the sensor cleaning unit, based on received environmental data.

In an embodiment, the system for cleaning the surface of a vehicle vision sensor, comprises a sensor cleaning unit, mounted on the vehicle, having at least one actuator configured to direct a fluid jet onto the vehicle vision sensor and a cleaning electronic control unit configured to receive vision sensor transmission surface obstruction level data from the vehicle vision sensor indicating an amount of obstruction of a transmission signal through the vehicle vision sensor transmission surface, wherein the cleaning electronic control unit determines at least one of a drive frequency and a drive amplitude for controlling at least one actuator of the sensor cleaning unit, when the amount of obstruction of the transmission signal exceeds a predetermined threshold.

The present invention also comprises a method for cleaning the surface of a vehicle vision sensor, including the steps of: (1) capturing environmental sensor data proximate the vehicle from a sensor cleaning unit sensor mounted on the vehicle; (2) determining, by a cleaning electronic control unit, at least one of a drive frequency and a drive amplitude for controlling at least one actuator of a sensor cleaning unit mounted on the vehicle; and (3) generating a fluid jet by the at least one actuator of the sensor cleaning unit to clean the surface of the vehicle vision sensor.

In other embodiments, the present invention comprises a system for cleaning the surface of a photovoltaic solar panel comprises a sensor cleaning unit, mounted on a peripheral edge of the photovoltaic solar panel, having at least one actuator configured to direct a fluid jet onto the photovoltaic solar panel; a cleaning electronic control unit configured to receive electricity generation efficiency data indicating obstruction of the photovoltaic panels from a control unit associated with the photovoltaic solar panel, or with an energy storage measuring device associated with the cleaning system, the cleaning electronic control unit determining at least one of a drive frequency and a drive amplitude for controlling the at least one actuator of the sensor cleaning unit, when the amount of generation efficiency falls below a predetermined threshold.

In embodiments, the actuator includes at least one heating element in order to control the temperature of the fluid jet. The actuator may also include a drainage and an electrically controlled nozzle cover to open or block the nozzle to prevent contaminants from entering the actuator when not in use.

In embodiments, the actuator is supplied with water which, when combined with the fluid jet, generates a water spray. The actuator may be mounted on or under a motorized plate in order to remove particles from a transmission surface which wraps 360 degrees around a vehicle mounted vision sensor. In embodiments the actuator also generates a fluid jet as it rotates around the circumference of the transmission surface and the rotating plate is controlled by an electronic control unit associated with one or more of the vision sensors, cleaning system or vehicle system in order to position the fluid jet in locations across the circumference of the transmission surface which encounter vision blockage by particles that adhere to it.

In embodiments, the actuator is integrated with a vision sensor and the fluid jet is channeled through a transmission surface which is shaped as a curved surface to cover the vision sensor for aerodynamic, optical, environmental or other reasons.

In embodiments, the sensor cleaning unit comprises two fluid jet nozzles, where one water nozzle is located between the two fluid jet nozzles for the release of water, configured so that the fluid jets dispensed from the fluid jet nozzles are combined with water from the water nozzle to generate a water spray. In embodiments, the two fluid jets are each operated with a different voltage amplitude such that each air-jet reaches a maximum amplitude at a different time in an alternating manner.

In embodiments, the flow rate in which water is released through the water nozzle is synchronized with the peak voltage amplitude of the two fluid jets in order to generate a water spray that has a lateral motion.

It is anticipated and within the scope of the invention that the invention is applicable for use on any surface that needs cleaning to maintain optimal transmissibility through the surface. It is also anticipated that the transmission surface might be on a moving platform such as a ground, maritime, aerial or extraterrestrial vehicle. The transmission surface might be on stationary platforms such as security and traffic safety vision sensors (cameras), energy assessment and monitoring vision sensors (LiDARs in wind farms), manufacturing processes optimization and quality control (such as IR, thermal cameras for video analytics), to name a few examples. For example, in addition to use with vehicles and PV cells, the invention may also be applied for use with stationary and mobile sensors like a sensor station used for environmental monitoring on earth, in space, and for lunar, Martian and other extraterrestrial explorations; for stationary sensor such as speed cameras, border control vision sensors, security cameras, vision sensors used for industrial process for monitoring and video analytics; for vision sensors in wearables such as suits and helmets; automotive windshields; glazed surfaces of building where maintenance and accessibility is difficult; and for energy harvesting surfaces (such as PV foils or sails) of satellites.

These and other features of the invention are described in, or apparent from, the following detailed description of various exemplary embodiments of this invention.

BRIEF DESCRIPTION OF THE DRAWINGS

The features and advantages of the present invention will be more fully understood by reference to the following detailed description of illustrative embodiments of the present invention when taken in conjunction with the following figures, wherein:

FIG. 3A is an illustration of the sensor cleaning unit where used with a vision sensor having a curved surface in accordance with an embodiment of the present invention.

FIG. 3B is an illustration of the sensor cleaning unit when used with a vision sensor having a flat surface in accordance with an embodiment of the present invention.

FIGS. 4A, 4B, 4C and 4D illustrate various air and water spray configurations of the sensor cleaning unit when used with a vision sensor having a flat surface in accordance with embodiments of the present invention.

FIGS. 5A and 5B illustrate packaging configurations of the sensor cleaning unit and vision sensor where used in connection with motor vehicles in accordance with an embodiment of the present invention.

FIG. 12 a graph of experimental data illustrating what is seen on the transmission surface when applying a cleaning cycle. The Y-axis shows the obstruction level assessment of a transmission surface; the X-axis is time.

It is emphasized that, according to common practice, various features/elements of the drawings may not be drawn to scale. On the contrary, the dimensions of the various features/elements may be arbitrarily expanded or reduced for clarity.

DETAILED DESCRIPTION OF THE EXEMPLARY EMBODIMENTS

Figure 1:
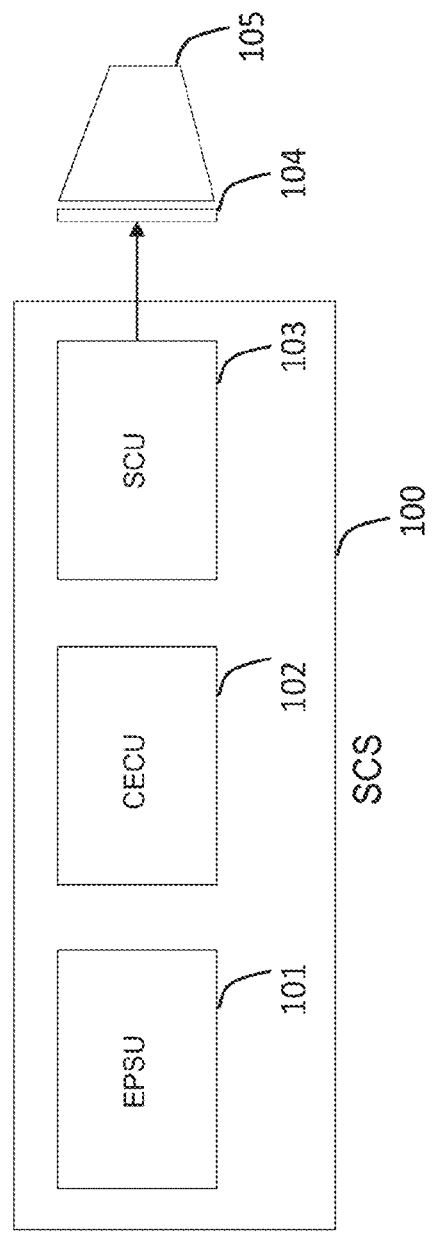
FIG. 1 is a schematic diagram illustrating an embodiment of the sensor cleaning system of the present invention where used in connection with a motor vehicle vision sensor.

Initially referring to FIG. 1, a schematic diagram illustrating an embodiment of sensor cleaning system 100 of the present invention is shown. Sensor cleaning system 100 (SCS) is comprised of an electronic power supply unit 101 (EPSU), a cleaning electronic control unit 102 (CECU), and a sensor cleaning unit 103 (SCU). EPSU 101 and CECU 102 provide power and signal respectively to SCU 103 in order to clean transmission surface 104 of vision sensor (VS) 105.

For example, in a preferred embodiment where SCS 100 receives input from CECU 102 indicating the need to commence cleaning of transmission surface 104, EPSU regulates the amount of power to send to SCU 103. CECU 102 determines what type of signal to output depending on the input it receives from vehicle electronic control unit (VECU) (not shown) or the VS electronic control unit (VSECU) (not shown).

To illustrate the implementation of an embodiment, in one example, a vehicle is moving at a speed of 50 mph on a highway during heavy rain (about a 4 mm diameter droplet size). To provide enough time for the vehicle to brake in case of obstruction on the path of the vehicle, a roof mounted LiDAR maintains a certain detection distance across a certain field vision. When the field of vision, detection distance and generally the ability to detect objects falls below a required threshold (often due to a reduction in signal intensity which translates to less points on objects being detected), an electronic control unit (the vehicle's, vision sensor or cleaning system) commands the actuator to operate at a certain actuation frequency which has been tested and discovered to be most effective in removing 4 mm droplets.

In another example, there may no longer be a heavy rain, but the transmission surface can be covered by spray splash from passing vehicles (about a 0.01 mm droplet size). The change in droplet size from the prior rain event is detected by a sensor and a command is issued to change the actuation frequency to another frequency which was discovered to be more effective smaller droplets.

To provide power to SCU 103, EPSU 101 may receive power from a power source independent of the vehicle, such as a battery or generator, or from the vehicle battery (both not shown). To provide data to the SCU, the CECU receives data from the vehicle electronic control unit (VECU) or the VS electronic control unit (VSECU). The EPSU and CECU can operate a single SCU as shown in FIG. 1, or an array of SCUs simultaneously (not shown).

Figure 2:
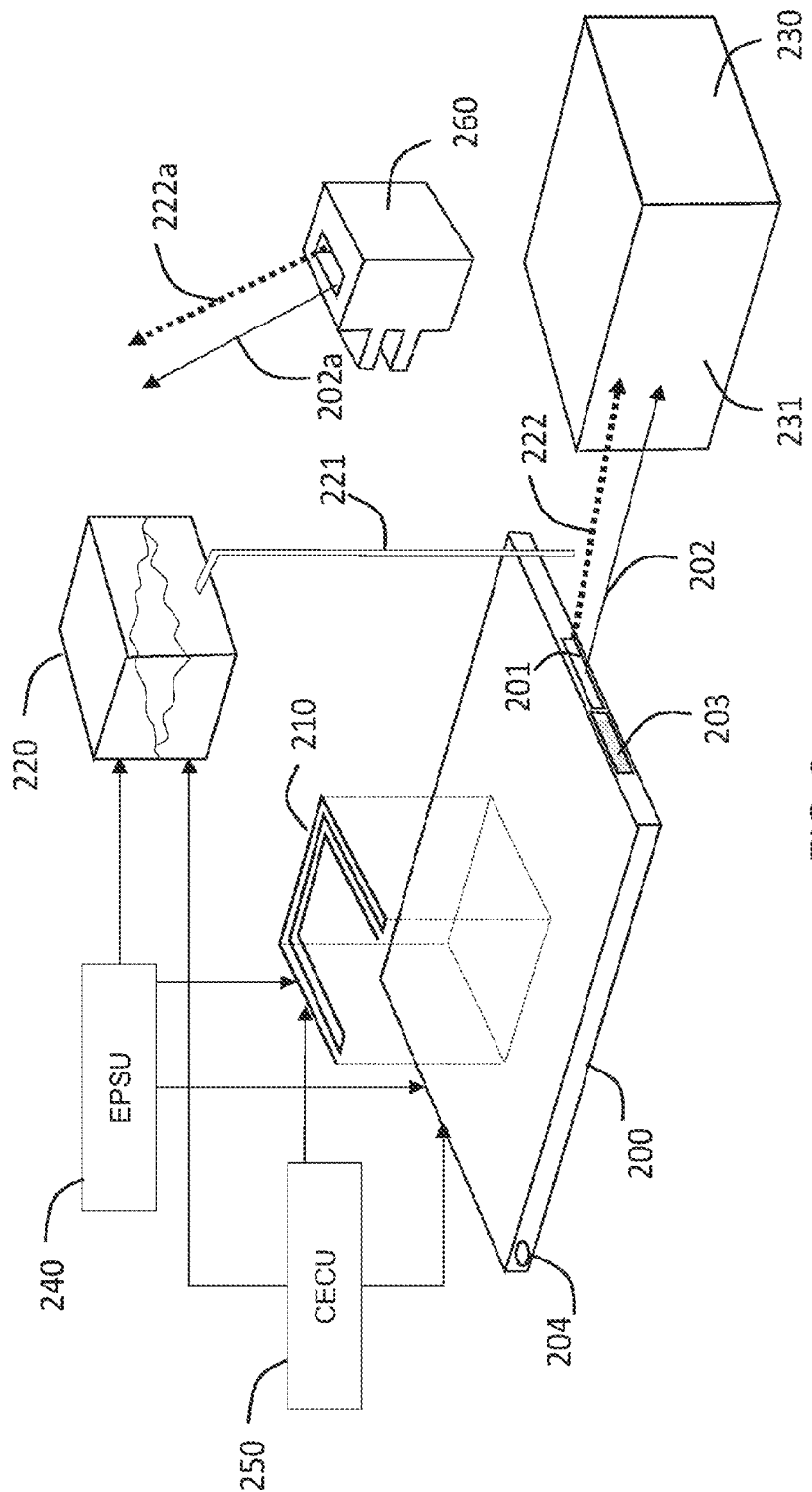
FIG. 2 is a schematic diagram illustrating an embodiment of the sensor cleaning unit, a component of the sensor cleaning system of the present invention.

FIG. 2 provides detail into the subsystems comprising the sensor cleaning unit, such as found in SCU 103. The SCU receives power from EPSU 240 and data from CECU 250. The SCU includes actuator 200, heating element 210 and water spray unit 220. In embodiments, heating element 210 is used to raise the temperature expelled through the nozzle outside the actuator in order to accelerate the de-freezing process of the transmission surface. Actuator 200 includes drainage opening 204 to let out particles (such as water or melted ice) which entered into the actuator while not operating. Nozzle cover 203 covers nozzle 201 when it is not operating to prevent contaminants from getting into the actuator.

In embodiments, when the SCU is engaged, EPSU 240 powers actuator 200 to generate air-jet 202 directed at transmission surface 231 of vision sensor (VS) 230. Air-jet 202 removes particles from transmission surface 231. In embodiments, CECU sends a signal to the SCU to activate water spray unit 220. In that scenario, EPSU 240 powers water spray unit 220 which supplies water through water supply conduit 221 to an opening near actuator 200 to generate water spray 222. By providing water spray 222 on transmission surface 231, the SCU washes away particles such as dust, mud, ice, etc., from transmission surface 231 which may not be effectively washed away using air jet 202 on its own. By alternating between water spray 222 and air-jet 202, the SCU can both remove wet and dry particles off the transmission surface, like the combined function of a windshield wiper and water spray in existing vehicles.

In embodiments (not shown), SCU includes a pair or more actuators to generate air-jet 202 and water spray 222. CECU 250 controls actuator 200 parameters such as frequency, waveform, duty cycle, on/off, and power amplitude. CECU 250 controls water spray unit 220 parameters such as on/off, and flow rate. Water spray provides water to water conduit 221 which brings water to nozzle 201 where the combination between the water and air-jet 202 creates water spray 222.

Adapter 260 shown not in use in FIG. 2, can be used in embodiments where the original articulation of air-jet 202 is not optimal for particle removal on transmission surface 231 due to SCU positioning constraints with respect to transmission surface 231. In such a scenario, adapter 260 is attached to actuator 200 such that air jet 202*a* is redirected through adapter 260 in order to reach transmission surface 231 (not shown in use with adapter 260) at the optimal angle for removing particles. In such an embodiment, the angle of air-jet 202*a* may be modified through channeling via adapter 260 until the optimal angle is obtained.

In other cases, adapter 260 is used to affect other parameters of air-jet 202 such as jet spread angle to cover a larger area of transmission surface 231. Spread angle through the use of adapter 260 can also be similarly adjusted through the use of channeling of adapter 260 until the optimal angle is reached.

In embodiments where a water spray is being generated with adapter 260 (not shown), water spray 222*a* (shown schematically) is generated by providing water through conduit 221 either into the adapter, using its internal channel as a mixing chamber, or next to its opening, as with nozzle 201, combining water and air-jet 202*a* to create water spray 222*a*.

Turning to FIG. 3A, an embodiment where the sensor cleaning unit is used with a vision sensor having a curved surface is shown. In embodiments, transmission surface 321 of vision sensor 320 is shaped as a curved surface for aerodynamic, optical, environmental or other purpose. In such an embodiment, nozzle 301 of actuator 300 may be integrated into transmission surface 321 such that air-jet 310 is channeled to cover transmission surface 321 to achieve particle removal across transmission surface 321. In embodiments, actuator 300 is integrated into the packaging of vision sensor 320 and its size may be dictated by constraints set forth by the sizing of vision sensor 320. In embodiments (not shown), actuator 300 may be part of a standalone SCU and not integrated into vision sensor 320. In embodiments where the actuator and vision sensor share packaging, the actuator is likely to be dedicated to the specific vision sensor. In that case, CECU and VSECU are the same and the vision sensor directly controls the operation of the cleaning process. In other words, the actuator is part of the vision sensor, and the vision sensor provides it with power and data to command its operation.

Turning to FIG. 3B, an embodiment where the sensor cleaning unit is used with a vision sensor having a flat surface is shown. In this embodiment, actuator 300 is located externally to the packaging of vision sensor 320. In other embodiments (not shown) actuator 300 may be integrated into the packaging of vision sensor 320. Turning to the operation of actuator 300, actuator 300 generates air-jet 310 and 311 in order to maintain transmission surface 321 clear of particles such that vision sensor 320 could detect objects in a manner required to maintain the safety of the vehicle. In one embodiment, particles 350 approach transmission surface 321 and adhere to its surface. In this case, actuator 300 generates air-jet 310 through nozzle 301 which removes particles 351 by blowing them away off the transmission surface. Actuator 300 can be engaged by the SCU (not shown) based on a variety of environmental factors, such as precipitation, water-based and dust-type particles and the interference caused to a transmission surface. In an alternative embodiment, actuator 300 can be programmed to actuate on a timed cycle, or in another embodiment on a continuous duty cycle.

In an alternate embodiment when actuator 300 operates on a continuous duty cycle (not shown), actuator 300 generates air-jet 311 through nozzle 301. Air-jet 311 is directed away from transmission surface 321 to create an air-curtain which deflects particles 352 from reaching transmission surface 321 such that they do not reach transmission surface 321. In this embodiment, air-jet 311 is created by an additional actuator. In such an embodiment, each actuator would be directed differently. One actuator would be directed towards the transmission surface and a second actuator would be directed away from the transmission surface at an angle of 0-45 degrees.

FIGS. 4A-4D, illustrate various configurations of the air and water spray configurations of the sensor cleaning unit when used with a vision sensor having a flat surface in accordance with embodiments of the present invention.

In the embodiment shown in FIG. 4A, water is released through nozzle 401*a*. Air-jet 404*a* is generated by actuator 400 through nozzle 403*a*. When air-jet 404*a* is combined with water through nozzle 401*a*, it generates water spray 402*a* in order to clean transmission surface 411 of vision sensor 410. In embodiments, air-jet 404*a* is controlled by the CECU in order to modify the properties of water spray 402*a* such as its spread, distance and particle size.

In the embodiment shown in FIG. 4B, water is released through nozzle 401*b*, located between air-jets 403*b* and 405*b*. Air-jets 404*b* and 406*b* are generated by actuator 400 through nozzles 403*b* and 405*b*, respectively. When air-jets 404*b* and 406*b* are combined with water through nozzle 401*b* it generates water spray 402*b* in order to clean transmission surface 411 of vision sensor 410. In this embodiment, air-jets 404*b* and 406*b* are operated with a phase angle difference and different voltage amplitude such that each air-jet reaches maximum amplitude at different times in an alternating manner. In an embodiment, the phase angle ranges from 0-180 degrees and the voltage ranges from 20-200 Vrms. In a preferred embodiment, the flow rate in which water is released through nozzle 401*b* is synchronized with the peak voltage amplitude of one or both of air-jets 404*b* and 406*b* in order to provide water spray 402*b* with lateral motion 407*b* which has been shown to improve particle removal capability as compared without a lateral motion component.

In the embodiment shown in FIG. 4C, air-jet 404*c* is generated by actuator 400 through nozzle 403*c* in order to remove particles from transmission surface 411 of vision sensor 410. In embodiments, actuator 400 and its corresponding air-jet 404*c* could be part of a larger array of actuators that comprise an SCU.

In the embodiment shown in FIG. 4D, water spray 402*d* is generated by actuator 400 through nozzle 401*d* in order to remove particles from transmission surface 411 of vision sensor 410. In this case, water is supplied into the internal part of actuator 400 (not shown) and is pushed out along with the air expelled through nozzle 401*d*. In another embodiment (not shown), the water is supplied into an adapter attached to nozzle 401*d*. In another embodiment (not shown), water is supplied next to nozzle 401*d* such that water spray 402*d* is generated by the air-jet passing through nozzle 401*d*.

Turning to FIGS. 5A and 5B, embodiments of various packaging configurations of the sensor cleaning unit and vision sensor where used in connection with motor vehicles in accordance with an embodiment of the present invention are shown. In the embodiment depicted in FIG. 5A, packaging enclosure 530 includes both actuator 500*a*, and vision sensor 510*a* with transmission surface 520*a*. Actuator nozzle 501*a* is built into enclosure 530. In this embodiment, actuator 500*a* and vision sensor 510*a* are designed to work together where vision sensor 510*a* commands actuator 500*a* through its associated controls hardware and software which determine when navigation performance is below a certain safety threshold and cleaning of transmission surface 520*a* through the use of actuator 501*a* is required.

In the embodiment depicted in FIG. 5B, actuator 500*b* and vision sensor 510*b* are independent from each other in terms of packaging enclosure. In this embodiment, actuator adapter 501*b* is attached to actuator 500*b* to direct air-jet 502*b* to more effectively remove particles from transmission surface 520*b*.

Figure 6B:
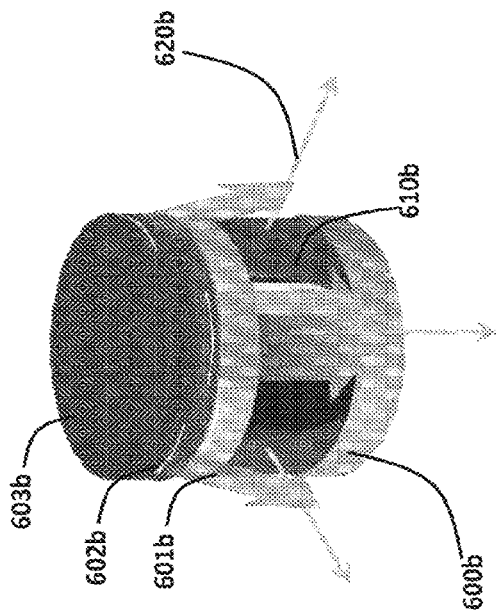
FIGS. 6A, 6B and 6C illustrate the sensor cleaning unit when used with a 360-degree vision sensor in accordance with embodiments of the present invention.
Figure 6C:
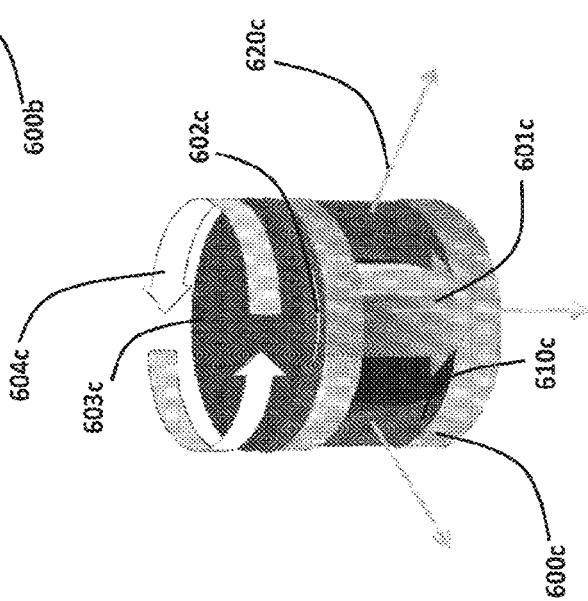
Figure 6A:
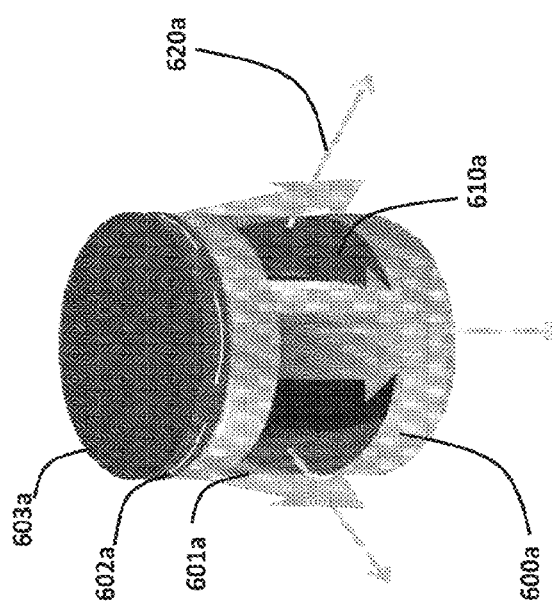

FIGS. 6A-6C illustrate the sensor cleaning unit when used with a 360-degree vision sensor in accordance with embodiments of the present invention. In the embodiment depicted in FIG. 6A, actuator 603*a* is mounted on or under vision sensor 600*a* to remove particles from transmission surface 610*a* which extends 360 degrees around vision sensor 600*a*. In this embodiment, actuator 603*a* is comprised of multiple nozzles 602*a* distributed along the circumference of vision sensor 600*a* in order to release air-jets 601*a* around the entire circumference of vision sensor 600*a*.

In the embodiment depicted in FIG. 6B, actuator 603*b* is mounted on or under vision sensor 600*b* to remove particles from transmission surface 610*b* which extends 360 degrees around vision sensor 600*b*. In this embodiment, actuator stack 603*b* includes several actuators where polar nozzle array 602*b* releases air-jets 601*b* around the entire circumference of vision sensor 600*a*.

In the embodiment depicted in FIG. 6C, actuator 603*c* is mounted on or under motorized plate 604*c* in order to remove particles from transmission surface 610*c* which extends 360 degrees around vision sensor 600*c*. In this embodiment, actuator 603*c* generates air-jet 601*c* through nozzle 602*c* as it rotates around the circumference of transmission surface 610. Rotating plate 604*c* is controlled, in embodiments, by the CECU, VSECU or VECU in order to position nozzle 602*c* to generate air-jet 601*c* in locations across the circumference of transmission surface 610*c* which encounter vision blockage by particles that adhere to it.

Figure 7:
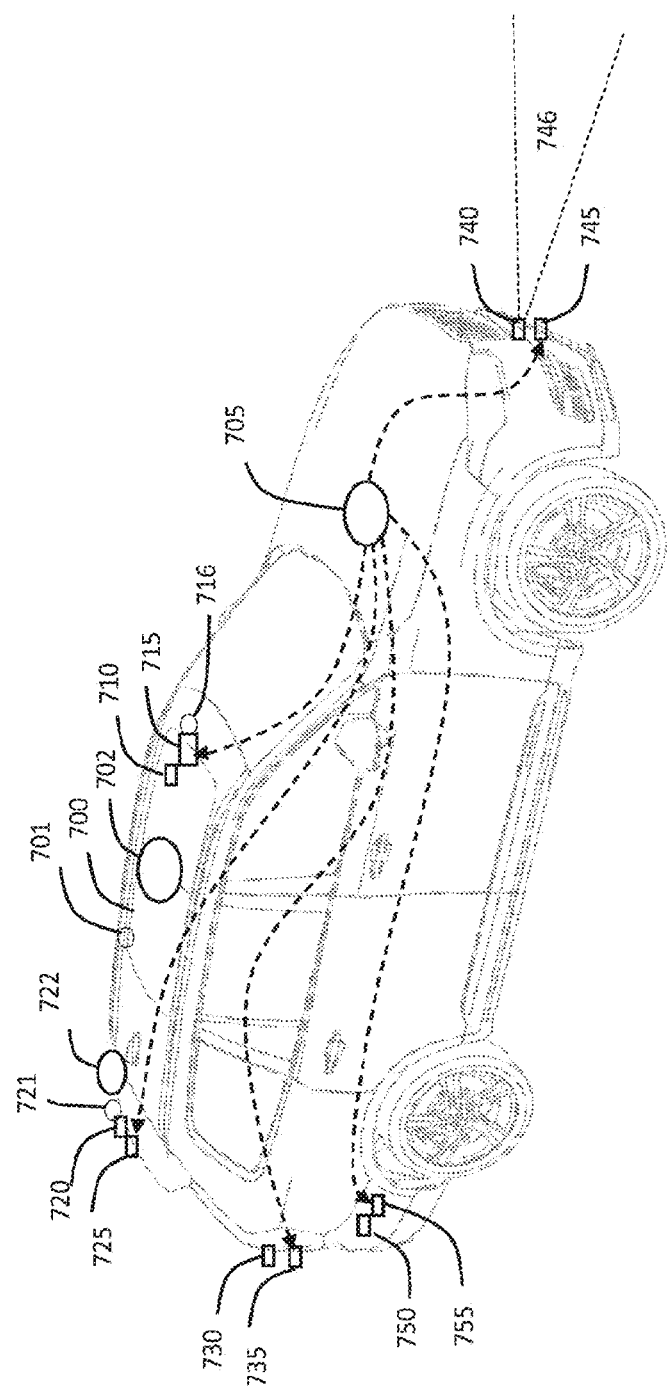
FIG. 7 is an illustration of sensor cleaning system integration configurations where used in connection with a moving vehicle in accordance with an embodiment of the present invention.

FIG. 7 is an illustration of sensor cleaning system integration configurations where used in connection with a moving vehicle in accordance with an embodiment of the present invention. In this embodiment, vehicle 700 can be either an autonomous or driver-assist vehicle. In embodiments, vehicle 700 is equipped with vehicle electronic sensor 701 (VES) which is tasked with providing required input for sensor cleaning purposes to the vehicle electronic control unit 702 (VECU) that is part of vehicle system (not the cleaning system); cleaning electronic control unit 705 (CECU); vision sensors 710, 720, 730, 740, 750 (VS). In embodiments, VS 710, 720, 730, 740, 750 can utilize vision sensing technologies such as Radar, LIDAR, or the visual light spectrum such as with cameras.

In embodiments, VS 710, 720, 730, 740, 750 are integrated into vehicle exterior surfaces such as the front and rear bumper, doors, wheel covers, roof and hood. In an alternate embodiment, VS 710, 720, 730, 740, 750 can be installed as stand-alone installations separate from vehicle body exteriors such as a pod installed on a roof rack or underbody of the vehicle. In an embodiment, certain VS are integrated into vehicle exterior surfaces and other VS are installed as stand-alone installations.

In embodiments, vehicle 700 is also equipped with sensor cleaning unit 715, 725, 735, 745, 755 (SCU) dedicated to cleaning the respective VS; sensor cleaning unit sensor 716 (SCUS), which in embodiments comprises a sensor such as a camera, precipitation sensor, airflow sensor, or the like, that provides the CECU required input for commanding the SCUS. In embodiments, vehicle 700 is also equipped with vision sensor 721 (VSS) and vision sensor electronic control unit 722 (VSECU).

Embodiments of the sensor cleaning system depicted in FIG. 7 can operate in various configurations. In one embodiment (the "Independent System approach") the control authority of the cleaning system is independent from vehicle 700 or VS 710, 720,730,740, 750. In this case, CECU 705 receives data required for cleaning from SCUS 716. Data received from SCUS 716 includes the size of area blocked by particles on transmission surface. CECU 705 analyzes the data and provides commands such as start/shutoff, voltage amplitude, actuation frequency, duty cycle, and waveform type to an array of SCUs 715, 725, 735, 745, 755 associated with their respective vision sensors at different locations on vehicle 700. In accordance with this embodiment, CECU 705 commands either a full array of SCUs, part of the array or a single SCU. When controlling more than one SCU, CECU 705 provides simultaneously different commands to various SCUs depending on parameters such as the type of VS they are tasked to, location around the vehicle, and local airflow conditions the VS is exposed to.

In one embodiment (the "Tier 2 approach"), SCU 715, 725, 735, 745, 755 are controlled by VS 710, 720, 730, 740, 750 respectively which it is tasked to clean. Each SCU receives commands through the VS system which includes VSS 721 and VSECU 722. In accordance with this embodiment, VSS 721 or VS 720 provides data required for cleaning to VSECU 722. VSECU 722 commands the dedicated SCU 725. SCU 725 performs a cleaning action and can be stopped once the VSS 721 or VS 720 provide input to the VSECU 722 that required vision level or associated performance associated with VS 720 has been attained.

In one embodiment (the "OEM approach") the cleaning system is controlled by the vehicle system including VES 721 and VECU 702. VECU 702 receives cleaning requests from VES 721. VECU 702 commands array of SCU 715, 725, 735, 745, 755 or one or more of SCU 715, 725, 735, 745, 755.

In one embodiment (the "Hybrid approach") to control an array of SCUs, an individual or part of the SCU array is controlled by one of the approaches discussed above (e.g., the Independent System approach, the Tier 2 approach, or the OEM approach) while one or more parts of the array are operated by the other approaches discussed above such that the entire array is controlled by at least two of the provided approaches.

Figure 8:
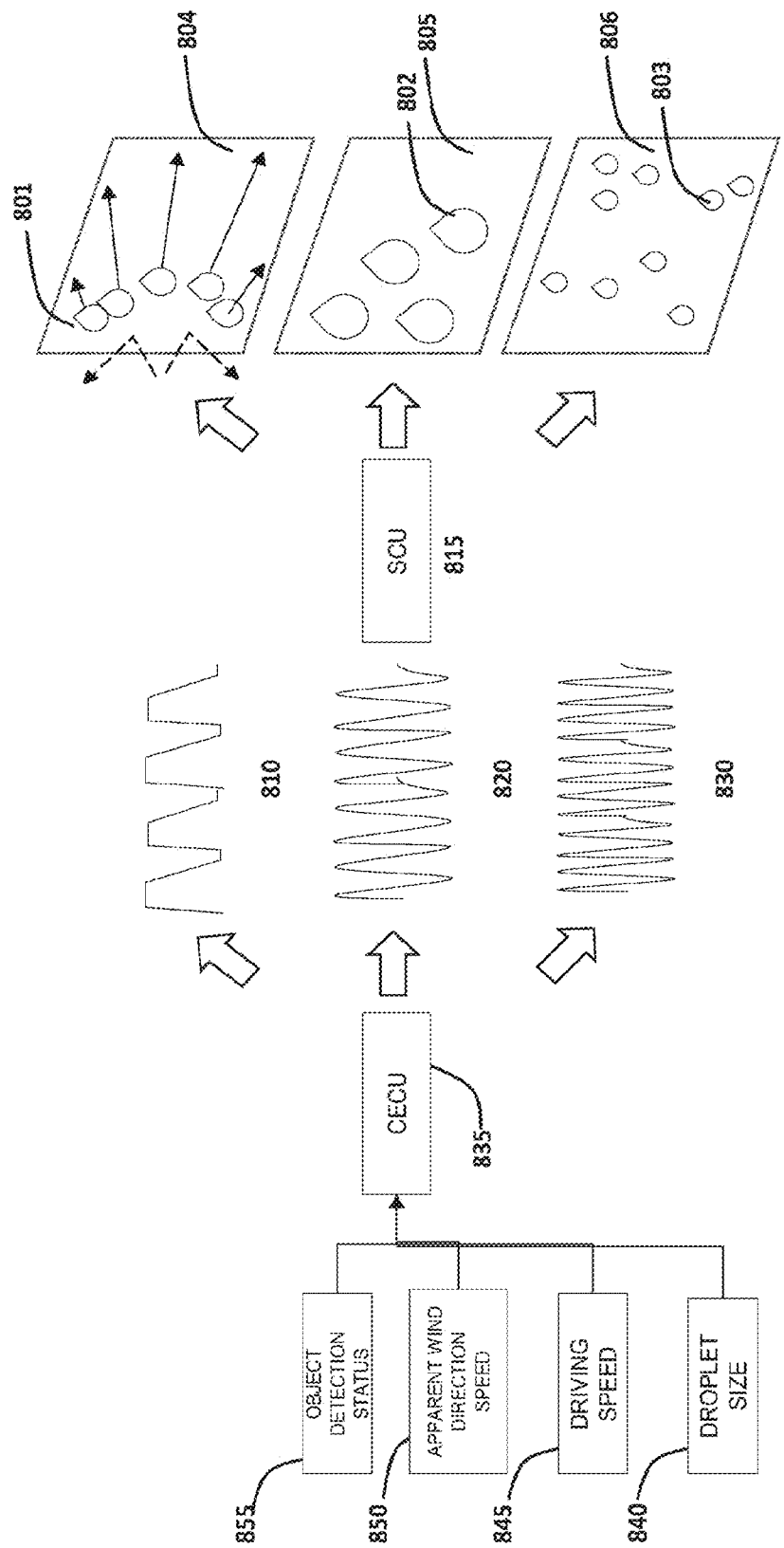
FIG. 8 is a schematic illustration of the operation of the sensor cleaning system where used in connection with a moving vehicle in accordance with an embodiment of the present invention.
Figure 9C:
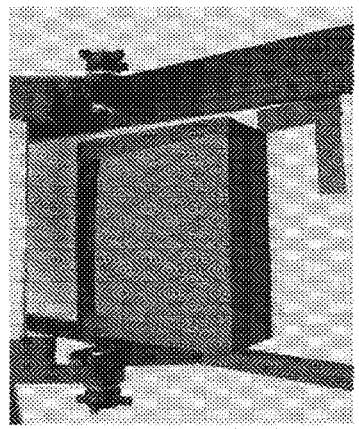
FIGS. 9A, 9B, 9C, 9D, 9E and 9F illustrate the dependency between water droplet size and actuation frequency using an actuator in accordance with embodiments of the present invention.
Figure 9F:
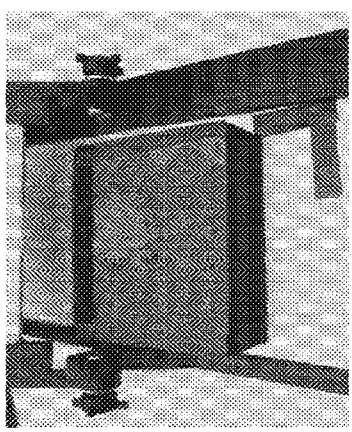
Figure 9B:
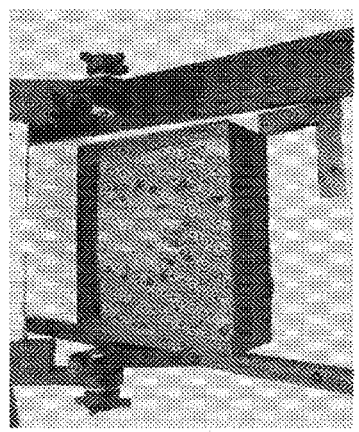
Figure 9E:
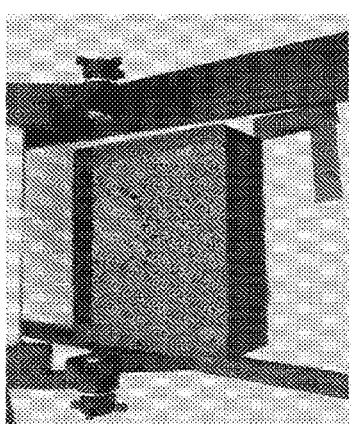
Figure 9A:
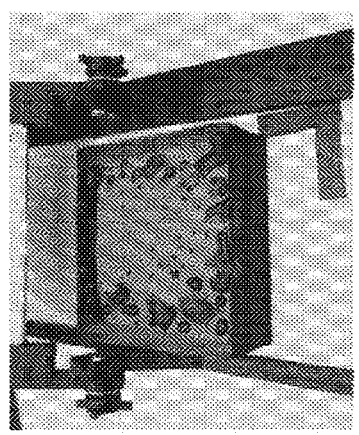
Figure 9D:
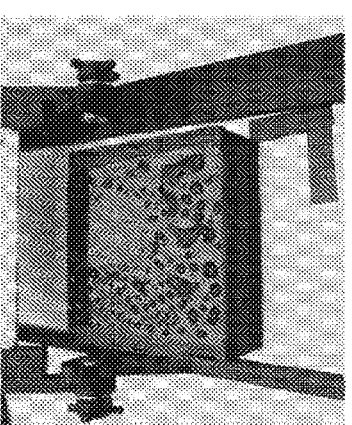
Figure 10E:
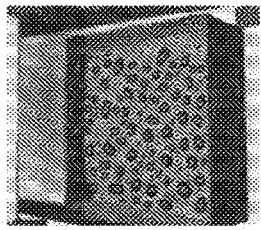
FIGS. 10A, 10B, 10C, 10D and 10E illustrate the interaction between air-jets using an actuator in accordance with embodiments of the present invention and water droplets of various diameters.
Figure 10D:
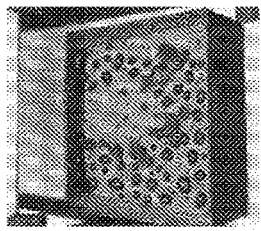
Figure 10C:
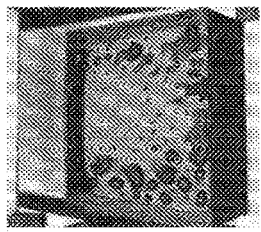
Figure 10B:
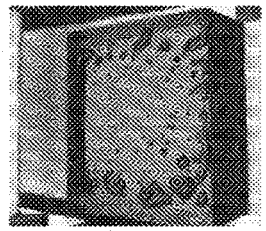
Figure 10A:
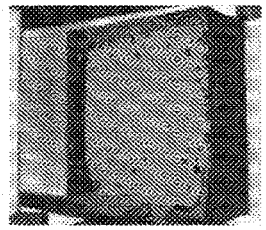
Figure 11:
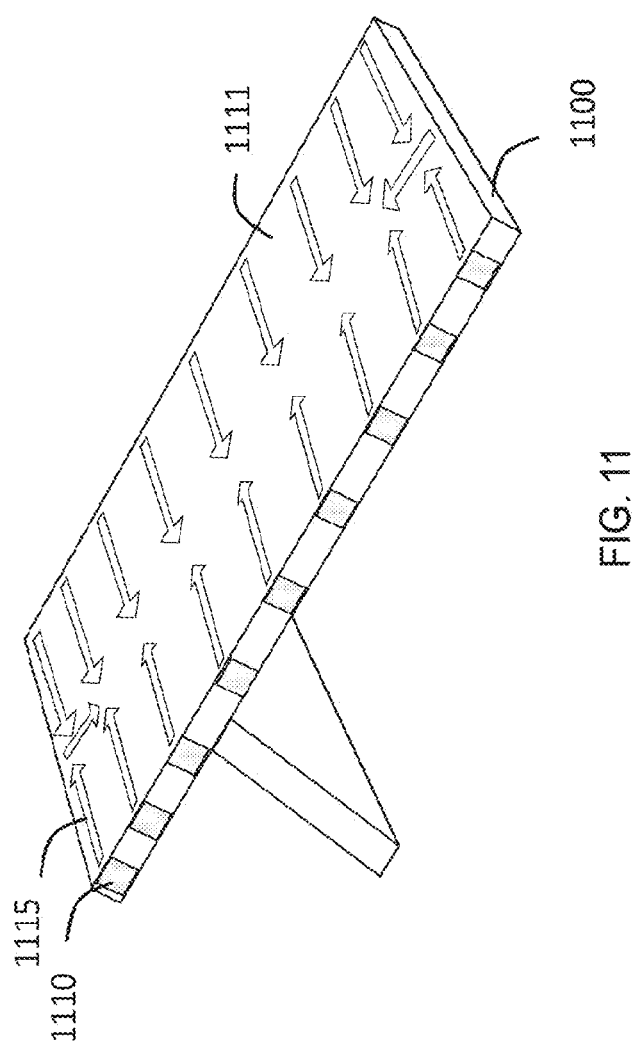
FIG. 11 is an illustration of a photovoltaic cleaning system used in connection with a photovoltaic panel in accordance with an embodiment of the present invention.

FIG. 8 is a schematic illustration of the operation of the sensor cleaning system where used in connection with a moving vehicle in accordance with an embodiment of the present invention. In this embodiment, the sensor cleaning system adapts cleaning performance to dynamic vehicle conditions. In this embodiment, a series of external environmental, operational, mechanical inputs such as droplet size 840, driving speed 845, apparent wind direction speed 850, and object detection status 855 of transmission surface 800 are provided to cleaning electronic control unit 835 (CECU).

CECU 835 provides input such as a trapezoidal waveform 810 of a certain frequency with a short rise and a long fall, a sinusoidal waveform 820 of a low frequency, and a sinusoidal waveform 830 of a high frequency, and could also include additional signal conditioning parameters such as a modulation frequency and a duty cycle in order to control one or more sensor cleaning unit actuators 815 to remove particles 801, 802, or 803, such as droplets of different dimensions, contact angle, and density; which are located at various places across transmission surface 804, 805, 806 of different importance for vision sensor performance.

It has been discovered that cleaning performance is a function of actuation parameters such as actuation frequency and waveform. Accordingly, in an embodiment when the control system senses particles of a certain size, then it transmits instructions for a trapezoidal waveform with a short rise and fall. The shape of the waveform—a sudden increase from no voltage to peak voltage—transforms into an abrupt air-jet issued by the actuator. When the air-jet hits the transmission surface at high speed at a very short time period, the droplets located in vicinity to the area hit by the air-jet are excited out of equilibrium and coalesce with neighboring droplets to form larger wetted areas.

It has been discovered that the air-jet is more effective in transporting these coalesced wetted areas across the transmission surface for a longer distance compared to much smaller droplets. It has also been discovered that different actuation frequencies of the same waveform, such as a pure sine wave, transport better different droplet sizes across the transmission surface. In a preferred embodiment, pre-designed signals are used. These pre-designed signals are constructed to include a sequence of waveforms at specific frequency of frequency range to be customized for a certain scenario. For example, a pre-designed signal might start by a number of trapezoidal waves to break and coalesce the droplets followed by low frequency sine wave cycles in order to transport the droplets across the transmission surface while reducing the power consumed by the actuator. Once the droplets are removed from the surface, the signal might change to a pulse width modulation with a duty cycle of 25% as a maintenance mode, meaning low power consumption air-jet that doesn't remove the particles entirely but delays their accumulation.

FIG. 12 presents experimental data illustrating what is seen on the transmission surface when applying a cleaning cycle. The Y-axis shows the obstruction level assessment of a transmission surface. In other words, the cleaning system records (through its sensor) how much of the transmission surface is blocked by water droplets. The X-axis is time. Starting from left to right, there is no obstruction on the transmission surface until water droplets land on the surface. Once the actuator is applied, the obstruction level drops, meaning that the actuator is removing some of the droplets and clears parts of the surface. The curves represent cases where the droplets on the transmission surface are of different size. As illustrated by FIG. 12, the actuator has a different impact as to droplets of different sizes.

FIGS. 9A, 9B, 9C, 9D, 9E and 9F illustrate the dependency between water droplet size and actuation frequency using an actuator in accordance with embodiments of the present invention. FIGS. 9A, 9B and 9C illustrate a high frequency (1040 Hz) actuator removing water droplets of 4 mm, 0.1 mm, 0.01 mm diameters respectively from a transmission surface. FIGS. 9D, 9E and 9F illustrate a low frequency (360 Hz) actuator removing water droplets of 4 mm, 0.1 mm, 0.01 mm diameters, respectively, from a transmission surface.

As seen in FIGS. 9A-9F, although a high frequency actuator has a higher speed, actuation frequency has a bigger impact on removing droplets of different sizes. Thus, while a high frequency actuator is very effective in removing large droplets and less effective with smaller droplets, a low frequency actuator has an opposite effect. Accordingly, in embodiments, a high frequency is used for an actuator to remove droplets of larger size (e.g., about 4 mm) while a low frequency is used to remove droplets of smaller size (e.g., about 0.01 mm). In embodiments, intermediate frequencies are chosen to remove droplets of intermediate size (e.g., between about 0.01 mm to about 4 mm).

FIGS. 10A, 10B, 10C, 10D and 10E illustrate the interaction between air-jets using an actuator in accordance with embodiments of the present invention and water droplets of various diameters. Specifically, FIGS. 10A, 10B, 10C, 10D, and 10E illustrate the interaction between the air-jet and 4 mm droplets covering a transmission surface. The initial impact of the air-jet leads nearby droplets to coalesce with other droplets in their vicinity.

Further, as illustrated in FIG. 10, using specific waveforms generates coalescence where the air-jet initially hits the optical surface. FIGS. 10A-10E illustrate actuation over a short amount of time. FIG. 10A shows a transmission surface with actuation of 0.7 seconds. FIG. 10B shows a transmission surface with actuation of 0.95 seconds. FIG. 10C shows a transmission surface with actuation of 1.24 seconds. FIG. 10D shows a transmission surface with actuation of 1.4 seconds. FIG. 10E shows a transmission surface with actuation of 4.51 seconds. As seen in FIG. 10E, after 4.51 seconds, the droplets have coalesced and cleaned the surface.

FIG. 11 illustrates a sensor cleaning unit using synthetic jet actuators in use with a photovoltaic panel 1100. In embodiments, actuators 1110 are mounted on a peripheral edge of photovoltaic solar panel 1100. In one embodiment, a cleaning electronic control unit (not shown) is configured to receive electricity generation efficiency data indicating obstruction of the surface 1111 of photovoltaic panels 1100. When the obstruction level reaches a certain threshold, actuators 1110 are initiated creating jet 1115 which is directed across surface 1111 of photovoltaic panel 1100 to clean the obstruction, such as dust, pollen and the like, from surface 1111.

What is claimed:

1. A system for cleaning the surface of a vehicle vision sensor, the system comprising:

a sensor cleaning unit, mounted on the vehicle, having at least one actuator configured to direct a fluid jet onto the vehicle vision sensor;

a sensor cleaning unit sensor, mounted on the vehicle, having at least one environment sensor configured to capture environmental sensor data proximate the vehicle;

a cleaning electronic control unit configured to receive the environmental sensor data from the sensor cleaning unit sensor and to determine at least one of a drive frequency and a drive amplitude for controlling at least one actuator of the sensor cleaning unit, based on the received environmental data.

2. The system of claim 1, wherein the environment sensor includes at least one of a precipitation sensor or an airflow sensor configured to determine apparent wind speed and wind direction.

3. The system of claim 2, wherein the precipitation sensor is configured to determine the diameter of rain droplet sizes during a precipitation event.

4. The system of claim 3, wherein the cleaning control unit sets a drive frequency ranging from 360 Hz for rain droplet diameter sizes of 0.01 mm to 1040 Hz for rain droplet diameter sizes of 4 mm.

5. The system of claim 4, wherein the actuator operates using pulse wave modulation.

6. The system of claim 5, further comprising a water source connected to the sensor cleaning unit, wherein
the cleaning electronic control unit is further configured to choose to use one of either water from the water source or ambient air for use with the actuator of the sensor cleaning unit, based on the received environmental data.

7. The system of claim 6, further comprising:
a cleaning electronic control unit configured to receive vision sensor transmission surface obstruction level data from the vehicle vision sensor indicating an amount of obstruction of a transmission signal through the vehicle vision sensor transmission surface, wherein
the cleaning electronic control unit determines at least one of a drive frequency and a drive amplitude for controlling at least one actuator of the sensor cleaning unit, when the amount of obstruction of the transmission signal exceeds a predetermined threshold.

8. The system of claim 1, wherein the actuator includes at least one heating element in order to control the temperature of the fluid jet.

9. The system of claim 1, wherein the actuator includes a drainage and an electrically controlled nozzle cover to open or block the nozzle to prevent contaminants from entering the actuator when not in use.

10. The system of claim 1, wherein the actuator is supplied with water which, when combined with the fluid jet, generates a water spray.

11. The system of claim 1, wherein the actuator is mounted on or under a motorized plate in order to remove particles from a transmission surface which wraps 360 degrees around a vehicle mounted vision sensor and further wherein
the actuator generates a fluid jet as it rotates around the circumference of transmission surface;
and the rotating plate is controlled by an electronic control unit associated with one or more of the vision sensor, cleaning system or vehicle system in order to position the fluid jet in locations across the circumference of the transmission surface which encounter vision blockage by particles that adhere to it.

12. The system of claim 1, wherein the actuator is integrated with a vision sensor and the fluid jet is channeled through a transmission surface which is shaped as a curved surface to cover the vision sensor for aerodynamic, optical, environmental or other purpose.

13. The system of claim 1, wherein the sensor cleaning unit further comprises two fluid jet nozzles wherein
one water nozzle is located between the two fluid jet nozzles for the release of water, configured so that the fluid jets dispensed from the fluid jet nozzles are combined with water from the water nozzle to generate a water spray.

14. The system of claim 13, wherein the two fluid jets are each operated with a different voltage amplitude such that each air-jet reaches a maximum amplitude at a different time in an alternating manner.

15. The system of claim 14, wherein the flow rate in which water is released through the water nozzle is synchronized with the peak voltage amplitude of the two fluid jets in order to generate a water spray that has a lateral motion.

16. A method for cleaning the surface of a vehicle vision sensor, the method comprising:
capturing environmental sensor data proximate the vehicle from a sensor cleaning unit sensor mounted on the vehicle;
determining, by a cleaning electronic control unit, at least one of a drive frequency and a drive amplitude for controlling at least one actuator of a sensor cleaning unit mounted on the vehicle,
generating a fluid jet by the at least one actuator of the sensor cleaning unit to clean the surface of the vehicle vision sensor.

17. A system for cleaning the surface of a photovoltaic solar panel, the system comprising:
a sensor cleaning unit, mounted on a peripheral edge of the photovoltaic solar panel, having at least one actuator configured to direct a fluid jet onto the photovoltaic solar panel;
a cleaning electronic control unit configured to receive electricity generation efficiency data indicating obstruction of the photovoltaic panels from a control unit associated with the photovoltaic solar panel, or with an energy storage measuring device associated with the cleaning system,
the cleaning electronic control unit determining at least one of a drive frequency and a drive amplitude for controlling the at least one actuator of the sensor cleaning unit, when the amount of generation efficiency falls below a predetermined threshold.

* * * * *